Sept. 23, 1930.   E. W. RIEMENSCHNEIDER   1,776,690
COLUMN
Filed July 13, 1926

Inventor
E. W. Riemenschneider
By Freau and Bond
Attorneys

Patented Sept. 23, 1930

1,776,690

UNITED STATES PATENT OFFICE

EDMUND W. RIEMENSCHNEIDER, OF CANTON, OHIO, ASSIGNOR TO THE UNION METAL MANUFACTURING COMPANY, OF CANTON, OHIO, A CORPORATION OF OHIO

COLUMN

Application filed July 13, 1926. Serial No. 122,101.

The invention relates to hollow columns such as are used for lighting standards, trolley poles and the like, and more particularly to a tapered fluted column of considerable height.

The object of the invention is to provide a hollow tapered fluted column, the walls of which are increased in thickness from top to bottom, thereby strengthening the column throughout its length substantially in proportion to the strain or load supported at each point.

The above and other objects may be attained by forming an integral tubular tapered fluted column of the desired length and diameter and strengthening or reinforcing the same by inserting one or more shorter tapered fluted column sections therein, each inner section being of decreased length, the sections fitting snugly one within the other.

Figure 1:
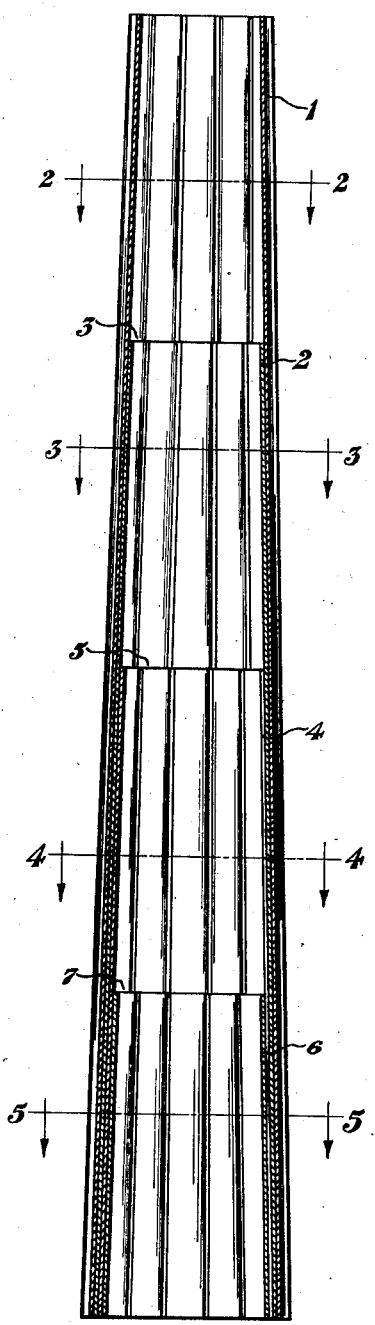
Figure 2:
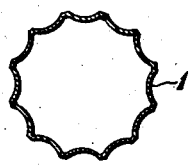
Figure 3:
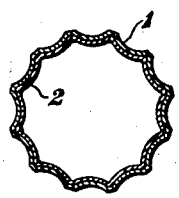
Figure 4:
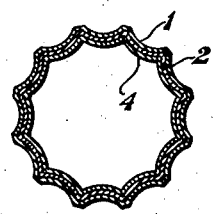

An embodiment of the invention is illustrated in the accompanying drawings, in which Figure 1 is a longitudinal sectional view through a column constructed in accordance with the invention;

Fig. 2, a transverse sectional view on the line 2—2, Fig. 1;

Fig. 3, a transverse sectional view on the line 3—3, Fig. 1;

Fig. 4, a transverse sectional view on the line 4—4, Fig. 1, and

Figure 5:
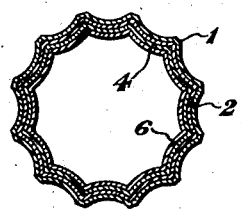

Fig. 5, a transverse sectional view on the line 5—5, Fig. 1.

Similar numerals refer to similar parts throughout the drawings.

In constructing the column in accordance with the invention, the tapered, fluted, tubular column 1 is formed of the desired length and exterior dimensions.

This column is preferably formed of sheet metal and as the length of the column increases, the weight and strain upon the lower portion of the column is increased proportionately.

Thus in a column formed of sheet metal and the like wherein the metal is of the same thickness throughout the length of the column, the lower portions of the column being of increasing diameters should necessarily be reinforced or strengthened to support the weight of the column as well as the weight of lighting equipment or other device carried at the upper end of the column and to resist strains to which the column will be subjected.

In carrying out the invention the lower portion of the column is strengthened or reinforced by inserting therein a tightly fitting tapered, fluted, tubular section extending any desired distance within the interior of the column and which may be connected thereto as by cement or the like. As the column increases in height these tubular reinforcing sections may be increased in number and each inner section being of less length, thus providing a substantially tapered wall throughout the column.

As illustrated in the drawing, the tapered fluted tubular section 2 is fitted tightly within the interior of the column 1 and extends from the lower end of said column to a point, indicated at 3, spaced from the upper end thereof.

A similar section 4 is fitted tightly within the section 2 and extends to a point, indicated at 5, spaced from the upper end of the section 2, and a similar shorter section 6 is fitted tightly within the section 4 and terminates at the point 7, spaced from the upper end thereof.

Each of these tubular reinforcing sections may be cemented or otherwise connected to the interior surface of the next section if desired although the sections are so tightly wedged one within the other that they will be retained in position without other connecting means, there being contact substantially throughout the entire outer surface of the inner section and the inner surface of the outer section.

The completed column thus has a smooth unbroken exterior surface from top to bottom, all of the reinforcing or strengthening means being within the column and hidden from sight; and the column is thus formed of a substantially taperd wall from bottom to top, being strengthened or reinforced throughout its length in proportion to the weight and strain to which it is subjected.

I claim:

1. A tapered, fluted, tubular column having strength throughout its length substantially in proportion to the greatest strains which it must resist at any section, including a tapered, fluted, tubular outer section, and a similar inner section extending from the lower end of the outer section, the inner section wedge fitting within the outer section and terminating at a point spaced from the upper end of the outer section, and there being contact substantially throughout the entire outer surface of the inner section and the inner surface of the outer section.

2. A tapered, fluted, tubular column having strength throughout its length substantially in proportion to bending strains which it must resist at any section and having its greatest strength at its lowermost section, including a tapered, fluted, tubular outer section, and a plurality of similar inner sections extending from the lower end of the outer section, the inner sections wedge fitting snugly within one another, and within the outer section, each inner section terminating at a point spaced from the upper end of the next outer section, and there being contact substantially throughout the entire outer surfaces of the inner sections and inner surfaces of the next outer sections.

In testimony that I claim the above, I have hereunto subscribed my name.

EDMUND W. RIEMENSCHNEIDER.